US005949218A

United States Patent [19]
Colles et al.

[11] Patent Number: 5,949,218
[45] Date of Patent: Sep. 7, 1999

[54] METHODS AND APPARATUS FOR MANAGING THE CHARGING AND DISCHARGING OF A LITHIUM BATTERY

[75] Inventors: Joseph H. Colles, Bonsall; Jean-Christophe Berchtold, Del Mar; Max A. Child, Fallbrook, all of Calif.

[73] Assignee: Conexant Systems, Inc., Newport Beach, Calif.

[21] Appl. No.: 09/045,276

[22] Filed: Mar. 20, 1998

[51] Int. Cl.⁶ .......................... H01M 10/44; H01M 10/46
[52] U.S. Cl. ............................................ 320/134; 320/136
[58] Field of Search ...................... 320/132, 134, 320/136, 137, 141, 145, FOR 108, FOR 126, FOR 138

[56] References Cited

U.S. PATENT DOCUMENTS

| 5,397,974 | 3/1995 | Tamai et al. . |
| 5,477,124 | 12/1995 | Tamai . |
| 5,637,413 | 6/1997 | Fernandez et al. . |
| 5,747,969 | 5/1998 | Tamai .................................. 320/141 |

OTHER PUBLICATIONS

Memo entitled "One–Cell Li–Ion Battery Pack Management" from Motorola Semiconductor Products Sector, Semiconductor Components Group, author and date unknown.
Ricoh, "Li–Ion Battery Protector RN5VM1xxC/D Series", May 1997.

Primary Examiner—Edward H. Tso
Attorney, Agent, or Firm—Snell & Wilmer

[57] ABSTRACT

An apparatus and corresponding method are provided for regulating the voltage potential of a lithium ion battery based upon an operating range having an upper threshold (e.g., on the order of 4.2 v) and a lower threshold (e.g., on the order of 2.5 v) and for providing a reduction in dissipated power when the lithium ion battery is charging and when a load is drawing upon the lithium ion battery. The apparatus includes a p-minus substrate and a first p-channel enhancement Field Effect Transistor (FET) integrally formed on the p-minus substrate. The first p-channel enhancement FET is configured to limit charging of the lithium ion battery when the voltage potential of the lithium ion battery is greater than the upper threshold. A second p-channel enhancement FET is integrally formed on the p-minus substrate and connected in parallel with the first p-channel enhancement FET and configured to limit discharging of the lithium ion battery when the voltage potential of the lithium ion battery is less than the lower threshold. A third p-channel enhancement FET is integrally formed on the p-minus substrate and connected in parallel with the first p-channel enhancement FET and the second p-channel enhancement FET. The third p-channel enhancement FET encompasses a substantially larger area of the p-minus substrate as compared to each of the first p-channel enhancement FET and the second p-channel enhancement FET such that a substantially reduced resistive path is presented by the third p-channel enhancement FET relative to the resistive paths associated with the first and second p-channel enhancement FETs. The reduced resistive path provides reduced dissipated power while the lithium ion battery is charging and when the load is drawing upon the battery in the operating range.

34 Claims, 5 Drawing Sheets

METHODS AND APPARATUS FOR MANAGING THE CHARGING AND DISCHARGING OF A LITHIUM BATTERY

BACKGROUND OF THE INVENTION

1. Field of the Invention

The present invention generally relates to the management of battery charging and discharging, and more particularly to a lithium battery protection circuit that provides proper charging and discharging so that optimum battery life and performance are obtained.

2. Description of Related Art

The number of electronic devices that are available in portable form has continued to increase over the years. These portable devices include cellular telephones, radios, pagers, voice recorders and the like. In order to provide portability, these electronic devices are generally configured to operate using a rechargeable battery. While many different battery technologies have been utilized, lithium ion batteries have characteristics that make them a preferred rechargeable cell.

The benefits of a lithium ion battery include high energy density, low weight and small overall size. However, while these characteristics can be seen to be advantageous in a portable setting, the unique operating requirements of a lithium ion cell must be addressed to effectively exploit this technology. Specifically, in order to achieve optimum battery life and performance, the potential of a lithium ion battery must be maintained within an operating range as defined by a lower threshold voltage and an upper threshold voltage. As this operating range is crucial in extending the battery life as well as performance, dual protection has been employed to ensure the battery potential remains within the desired range. Generally, this is accomplished by using both a protection circuit included with the battery charger, and a battery manager that is formed as an integral part of the battery. An illustration of a prior art battery manager 20 is shown in FIG. 1.

Referring to FIG. 1, it can be seen that the battery manager 20 has a controller 24 that passively monitors the potential of the battery 22. Based upon this measured value, a voltage is received by a first gate 26 of a first n-channel enhancement Field Effect Transistor (FET) 28 and a second gate 30 of a second n-channel enhancement FET 32 disposed in series with the first FET 28. The voltage presented to the FET gates 26,30 configures the FETs 28,30 such that flow from the charger 34 to the battery 22 and the current flow from the battery 22 to the load 36 (e.g., cellular telephone) is regulated to maintain the voltage of the battery 22 between an upper threshold voltage and a lower threshold voltage.

In operation, a voltage is applied to the first gate 26 and second gate 30 when the voltage of the battery 22 is between the upper threshold and lower threshold. Therefore, the first FET 28 and second FET 32 are active and the battery 22 is connected to the cellular phone 36 and charger 34. In this manner, the battery 22 can draw upon the charger 34 or the cellular phone 36 can utilize the battery 22 if the charger 34 is unavailable. However, if the battery 22 is approaching the upper or lower threshold, application of a voltage to the first gate 26 or second gate 30 is discontinued so that current flow is restricted and battery charging or discharging is terminated.

The two FETs 28,32 restrict current flow in conjunction with a first diode 38 reversed in polarity with respect to a second diode 40. If the voltage of the battery 22 approaches (or achieves) the upper threshold, voltage application to the second gate 30 is discontinued and any current is forced to flow through the second diode 40. This terminates current flow from the charger 34 to the battery 22 and allows current to flow only from the battery 22 to the cellular phone 36 as necessary to operate the device (i.e, charging is discontinued and the battery 22 is available to the cellular phone 36).

Conversely, if the battery 22 approaches (or hits) the lower threshold, the voltage is not applied to the first gate 26 and any current is forced to flow through the first diode 38. Consequently, current will cease to flow from the battery 22 to the cellular phone 36, but the battery 22 will be able to draw upon the charger 34 (i.e., battery charging is available while the cellular phone 36 is unable to use the battery 22 as a power source). While this configuration adequately controls the discharging and charging of the battery 22 so that the battery potential remains within the desired range, significant disadvantages exist.

Prior to the present invention, battery managers were manufactured with discrete devices. This was primarily due to FET isolation requirements as undesirable leakage was possible when multiple FETs were contained in the same substrate. However, the use of discrete devices significantly increases production costs and unit complexity. Furthermore, as a small path resistance between the charger and the load is desirable to avoid excess power dissipation in the current transmission from the battery to the load or from the charger to the battery, large area transistors were required in a series combination so that a minimum path resistance (e.g., 50 milli-ohms) could be achieved. However, FETs encompassing large areas tend to increase manufacturing costs and limit efforts to achieve minimum package sizes.

An improved battery manager is thus needed which effectively maintains a battery voltage within a specified voltage range in a cost effective manner yet addresses the concerns of transistor leakage, power dissipation, and component size.

SUMMARY OF THE INVENTION

An apparatus and method are provided for regulating the voltage potential of a battery based upon an operating range having an upper threshold and a lower threshold and for providing a reduction in dissipated power when the battery is charging and when a load is drawing upon the battery. The apparatus includes a substrate and a first microelectronic switch integrally formed on the substrate. The first microelectronic switch is configured to limit charging of the battery when the voltage potential of the battery is greater than the upper threshold. A second microelectronic switch integrally is formed on the substrate and connected in parallel with the first microelectronic switch and configured to limit discharging of the battery when the voltage potential of the battery is less than the lower threshold. A third microelectronic switch is integrally formed on the substrate and connected in parallel with the first microelectronic switch and the second microelectronic switch. The third microelectronic switch encompasses a substantially larger area of the substrate as compared to each of the first microelectronic switch and the second microelectronic switch such that a substantially reduced resistive path is presented by the third microelectronic switch relative to the resistive paths associated with the first and second microelectronic switches. The reduced resistive path provides reduced dissipated power while the battery is charging and when the load is drawing upon the battery in the operating range.

Additional advantages and features of the present invention will become apparent from the subsequent description and claims taken in conjunction with the accompanying Drawing figures.

BRIEF DESCRIPTION OF THE DRAWINGS

Other advantages of the invention will become apparent upon reading the following detailed description and upon reference to the following drawings, in which.

DESCRIPTION OF THE PREFERRED EMBODIMENT

The following description of the preferred embodiment is mainly exemplary in nature and is in no way intended to limit the invention or its application or uses.

Figure 1:
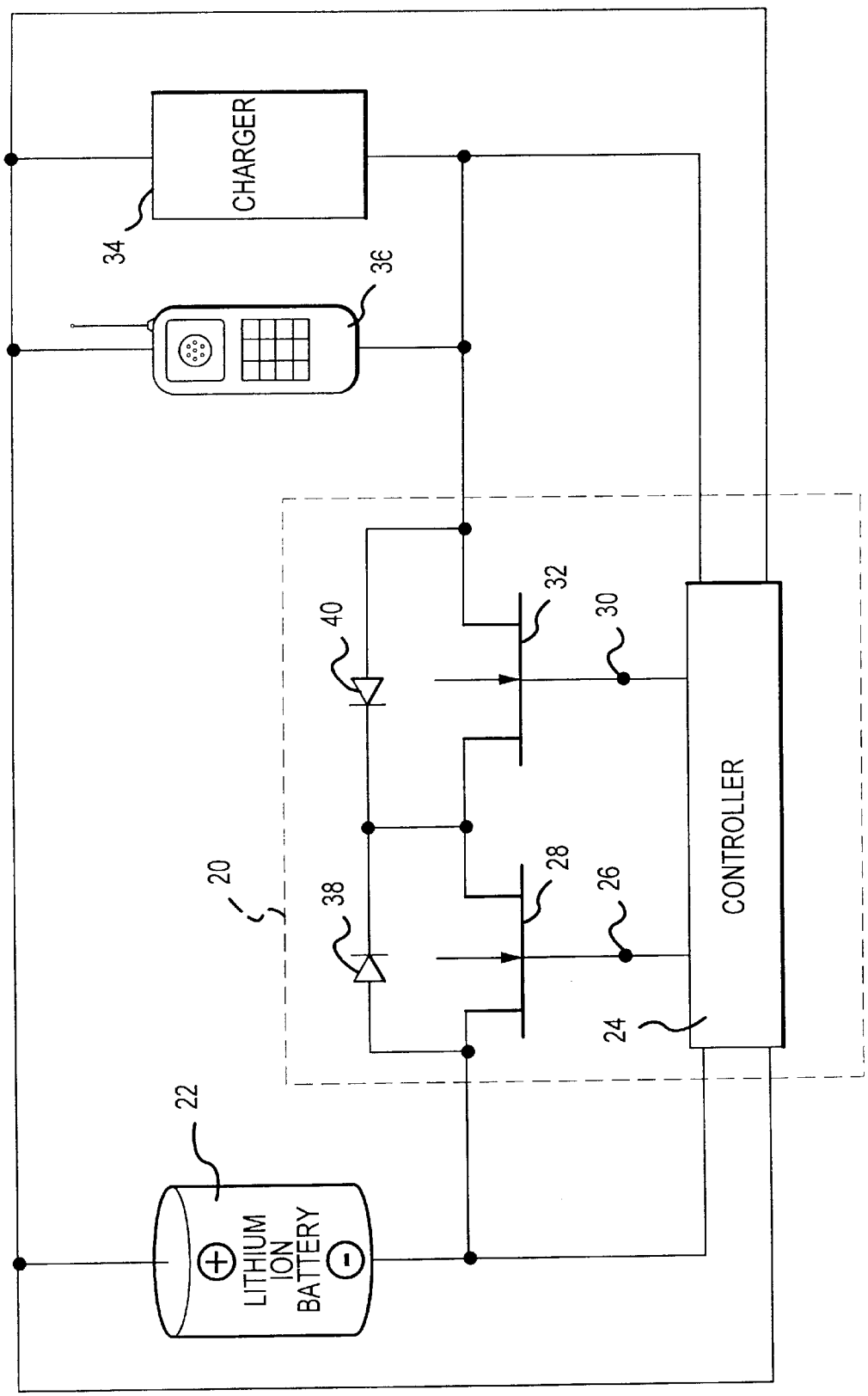
FIG. 1 is a schematic illustrating a battery management system of the prior art.
Figure 2:
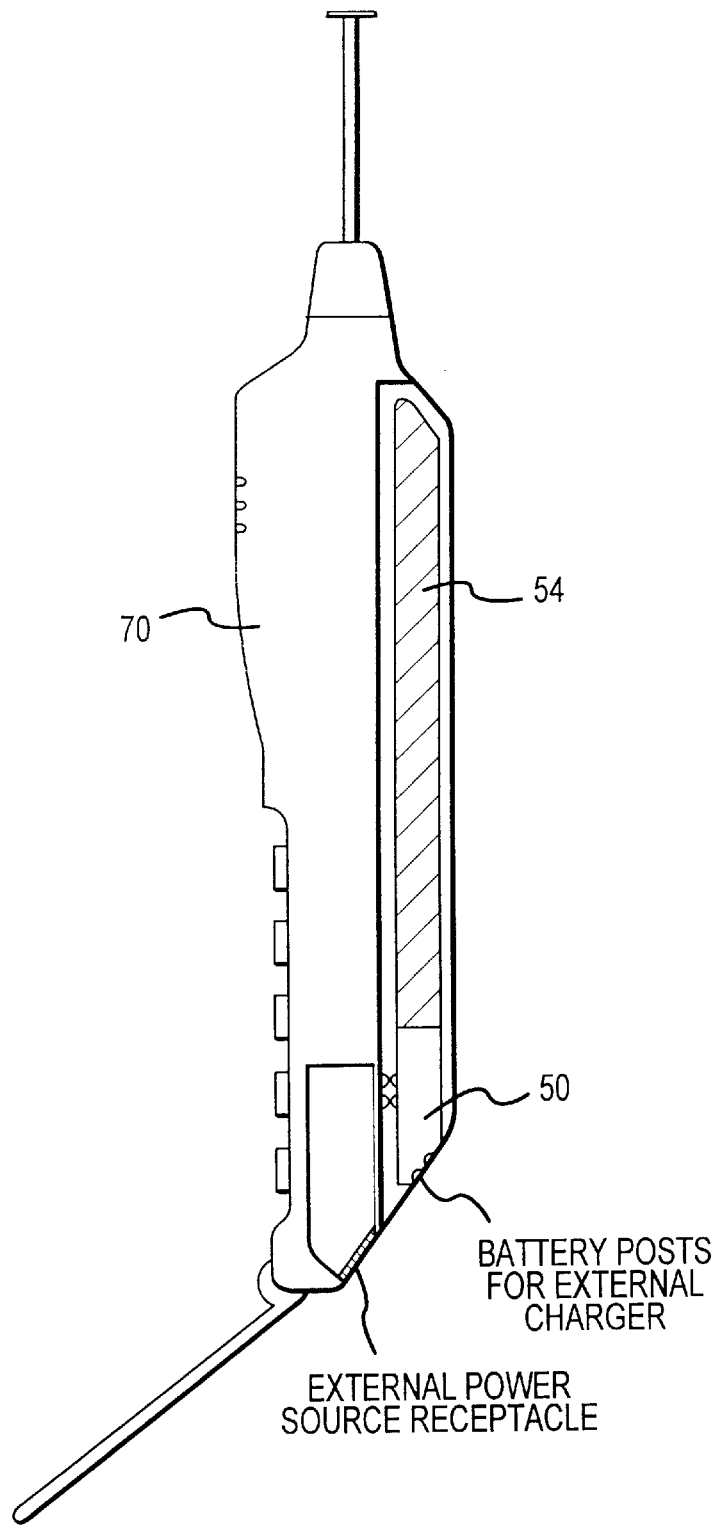
FIG. 2 is a portable electronic device having a battery manager that is integrally formed with a battery.

A portable electronic device 70 having a battery manager 50 that is integrally formed with a lithium ion battery 54 is illustrated in FIG. 2. To prevent excessive discharging or charging of a rechargeable battery, methods have been employed that detect battery voltage and cut-off battery charging or discharging when that voltage drops below or rises above a given value. For example, U.S. Pat. No. 5,477,124, titled "Circuit to Prevent Excessive Rechargeable Battery discharge," U.S. Pat. No. 5,397,974, titled "Rechargeable Battery Overdischarge Prevent Circuit," and U.S. Pat. No. 5,637,413, titled "Overvoltage Disconnect Circuit for Lithium Ion Batteries" disclose such methods and are herein incorporated by reference.

Figure 3:
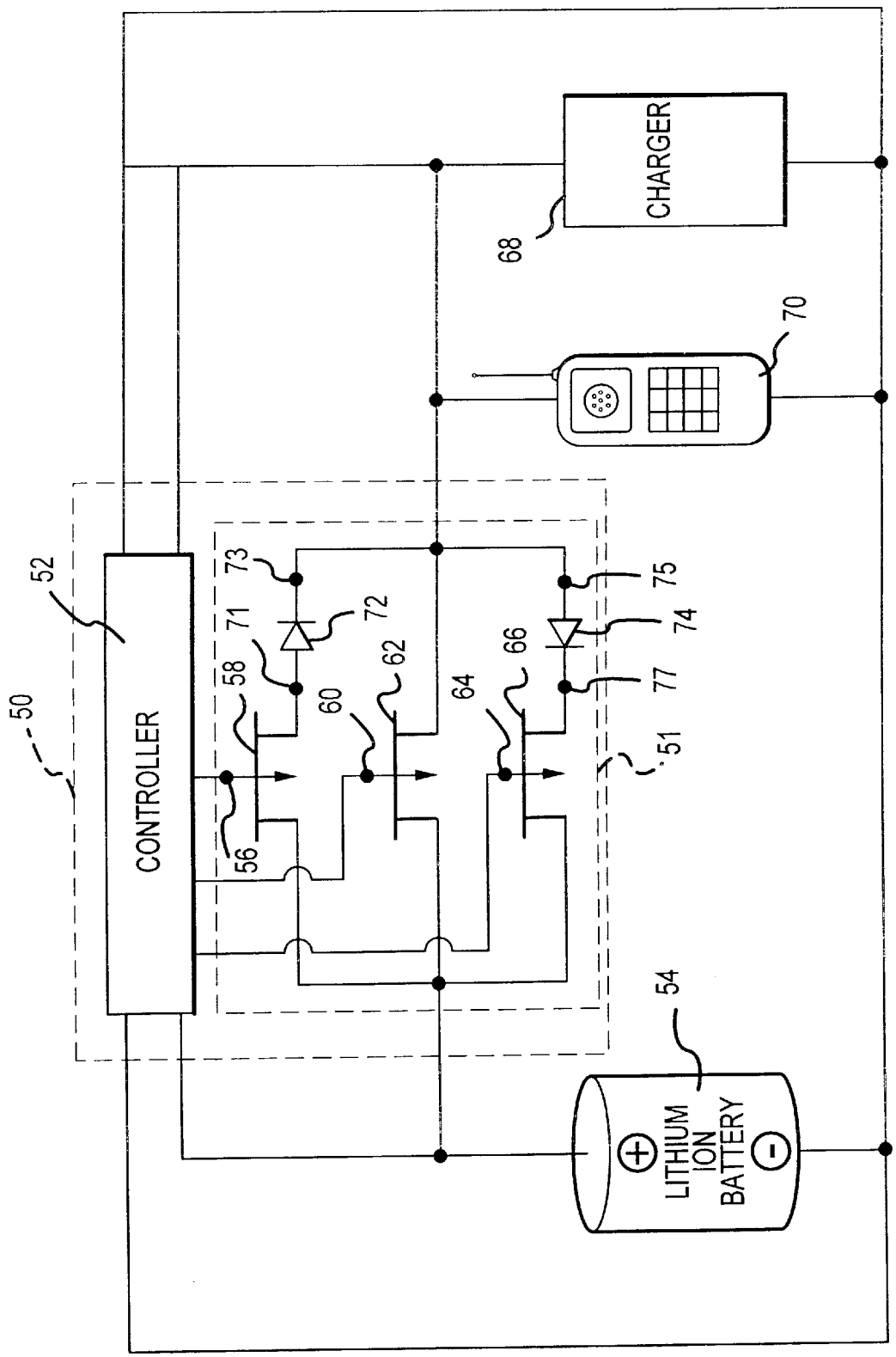
FIG. 3 is a schematic illustrating additional details of the battery management system of FIG. 2, including a protection circuit according to a preferred embodiment of the present invention.

FIG. 3 presents a schematic view of an exemplary embodiment of the invention showing additional details of the battery manager 50 having a protection circuit 51. As can be seen in FIG. 3, the battery manager 50 includes a controller 52 that passively monitors the voltage of a battery 54 upon which a control signal is generated and presented to three microelectronic switching devices that are preferably connected in parallel.

Figure 4:
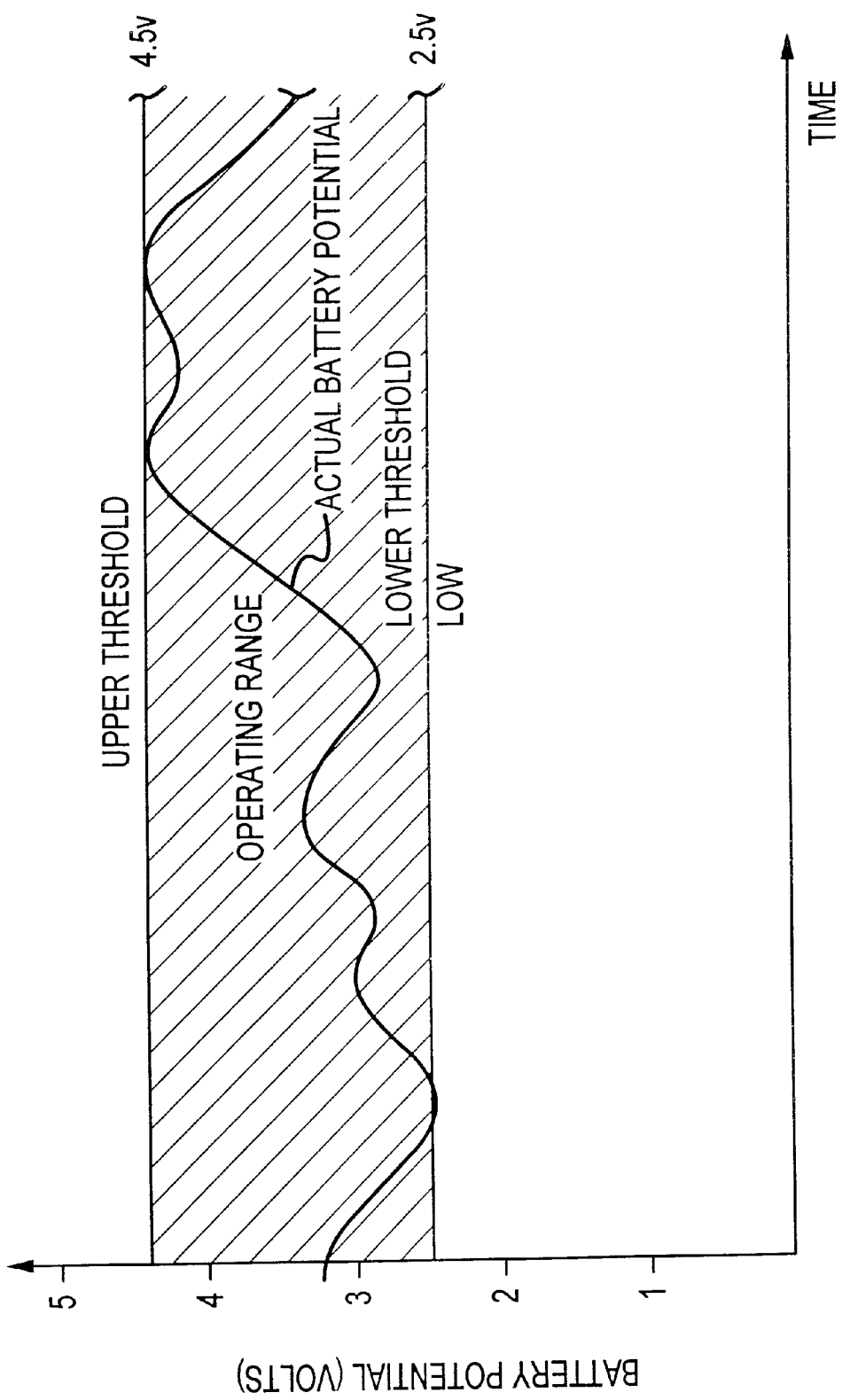
FIG. 4 is a lithium ion operating range as defined by an upper threshold and lower threshold.

In this preferred embodiment, the control signal is a voltage that is applied to one of either a first gate 56 of a first FET 58; a second gate 60 of a second FET 62 that is in parallel with the first FET 58; or a third gate 64 of a third FET 66 that is in parallel with the first FET 58 and second FET 62. The voltage is applied to one of the respective FET gates 56, 60, 64 such that the current flow from the charger 68 to the battery 54 and the current flow from the battery 54 to the load 70 is regulated by the configuration of the FETs 58, 62, 66 to maintain the potential of the battery 54 within a specific operating range so that optimum battery life and performance are obtained. Alternatively, one or more of the gates 56, 60, and 64 may be simultaneously activated as necessary to implement the control strategies as discussed above. In order to achieve this result, the battery manager 50 must take appropriate actions such that the battery potential does not exceed an upper threshold (e.g., on the order of 4.2 v) and does not fall below a lower threshold (e.g., on the order of 2.5 v). See FIG. 4 for an example of a lithium operating range as defined by an upper threshold and a lower threshold.

Due to considerations of cost, size, reliability, and additional advantages to be subsequently discussed, it is preferred that the microelectronic switches 58, 62, 66 are p-channel enhancement FETs. FETs are widely utilized as switch devices and are accordingly well understood, although it will be appreciated that other microelectronic switches may be used equivalently. It is important to note that while previous solutions may suggest that a three component device would be more complex and costly than a two component device, the three parallel switches of the present invention tend to reduce complexity, cost, and size of the battery manager.

In accordance with the illustrated embodiment, the portable electronic device 70 or load is suitably a cellular telephone. However, it should be readily understood that this invention is not limited to a cellular telephone and is applicable to a wide variety of electronic devices. Furthermore, while the preferred embodiment is described in the context of a lithium ion battery, the invention is applicable to other battery types that required similar regulation.

Continuing with FIG. 3, when the voltage of the battery 54 is between the upper threshold and lower threshold voltages, a voltage is presented to the second gate 60 and voltages are not applied to the first gate 56 and third gate 64 such that only the second FET 62 is active and the battery 54 is connected to the cellular phone 70 and charger 68. In this state, the battery 54 can draw upon the charger 68 or the cellular phone 70 can utilize the battery 54 if the charger 68 is unavailable. However, if the battery 54 is approaching the upper or lower threshold, application of the voltage to the second gate 60 ceases and the first FET 58 or third FET 66 are activated through application of a voltage to the first gate 56 or third gate 64, respectively. In this way, current flow is directed to a single branch having the active FET and a first or second device that restricts the direction of current flow.

If the voltage of the battery 54 is approaching the upper threshold, a voltage is applied to the first gate 56 and any current is forced to flow through a first diode 72. The anode 71 of the first diode 72 is connected to the first FET and the cathode 73 is connected to the charger 68 (as shown). Alternatively, the cathode 73 of the first diode 72 may be connected to the first FET 58 and the anode 71 may be connected to the battery 54. This configuration will significantly limit current flow from the charger 68 to the battery 54 and allow current flow from the battery 54 to the cellular phone 70 as necessary to operate the device (i.e, charging is discontinued and the battery 54 is available to the cellular phone 70).

In the event that the potential of the battery 54 is approaching the lower threshold, a voltage is applied to the third gate 64 but is not presented to the first and second gates 56, 60. In this way, any current is forced to flow through the second diode 74. The anode 75 of the second diode 74 is connected to the charger 68 and the cathode 77 is connected to the third FET 66 (as shown), or the anode 75 is connected to the third FET 66 and the cathode 77 is connected to the battery 54. Therefore, current flow from the battery 54 to the cellular phone 70 will be significantly limited, but the battery 54 will be able to draw upon the charger 68 (i.e., battery charging is available and the cellular phone 70 is unable to use the battery 54 as a power source).

In addition to the foregoing regulation of the battery potential, the protection circuit 51 protects against the negative affects that result if a short circuit occurs in the load 70. Such an occurrence is identified by monitoring the current flow through the FETs 58,62,66. A short circuit condition is identified when the current being monitored is significantly out of tolerance. In the event that a short circuit condition is detected, all connections between the battery 54 and the load 70 are severed by discontinuing the application of voltage to the three gates 56,60,64 of the FETs 58,62,66, thereby deactivating the FETs and producing an open circuit between the load 70 and battery 54.

Figure 5:
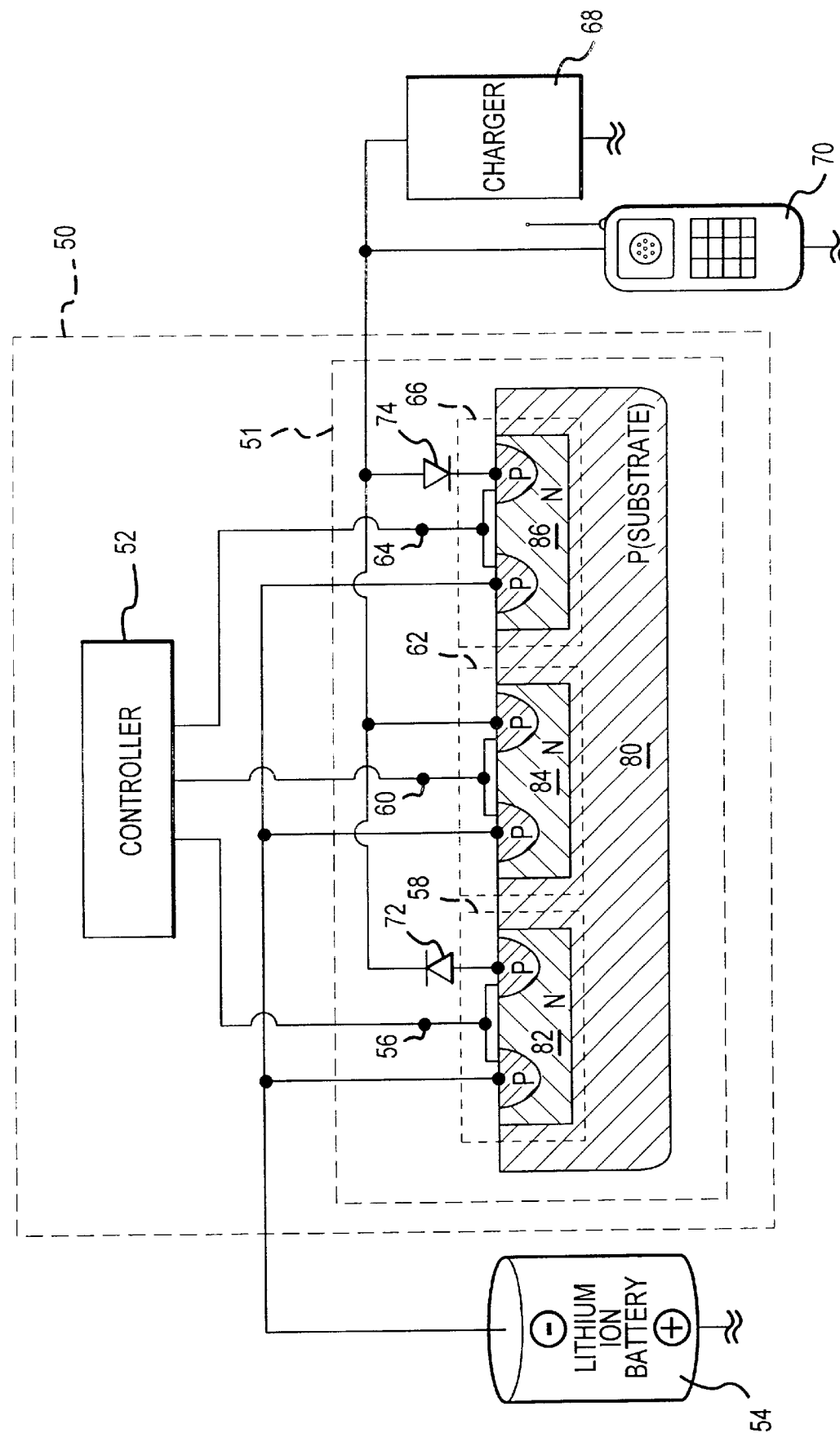
FIG. 5 is a cross-sectional view of the protection circuit of the present invention as integrally formed on a single substrate.

As previously indicated, it is preferred that the microelectronic switches 58, 62, 66 are p-channel enhancement FETs. Referring to FIG. 5 and in accordance with the illustrated embodiment, the three FETs 58,62,66 are integrally formed on a single p-minus substrate 80. The p-channel enhancement FET is preferred as it is possible to isolate each transistor and minimize leakage when a p-minus substrate is utilized. When an n-type device is formed in a p-minus substrate, the substrate is common to all of the n-type devices. Therefore, it is not possible to isolate each of the n-type devices as each has a drain and source diodes to the grounded p-minus substrate.

Isolation is available for multiple p-channel FETs as shown in FIG. 5 because each of the FETs 58,62,66 are in an individual n-type well 82,84,86, respectively. Each of these wells can seek different levels and basically float about a diode below the drain or source, depending on which is at a greater potential. In the event that it is desirable to form a plurality of devices on a single n-substrate, n-channel FETs would be desirable to provide isolation between the transistors.

The parallel pad arrangement of the three FETs 58,62,66 also provides a reduction in size and correspondingly, a reduction in cost. This is due to a substantial reduction in size of the first and third FETs 58,66 as only the second FET 62 must have an area that presents a small resistive path between the battery 54, portable device 70, and charger 68.

As previously discussed, the second FET 62 is active and the first and third FETs 58, 66 are inactive when the battery 54 is within the proper operating range. When the battery is within the desired range, it is preferable to maximize utilization of the battery 54 by the load 70 and optimize charging of the battery 54 (i.e., avoid unnecessary power dissipation while the battery 54 is charging or the portable device 70 is drawing upon the battery). Generally, a total path resistance of less than 50 milli-ohms is sought. Because a transistor that provides a 50 milli-ohm resistance requires significant area (i.e, in the vicinity of 750,000 microns by 0.6 microns), limiting the number of these large transistors is advantageous. As the second FET 62 is the only active device when power dissipation is a concern, only one FET must have a such an area.

In the situation where the battery potential has fallen outside the operating range, a low resistive path is much less of a concern. Specifically, when the battery potential has risen above the upper threshold, a reduction in the battery potential is desirable and a greater load as seen by the battery 54 will assist in such a depletion. With a high resistance for the first FET 58, a greater load is presented to the battery 54 and the desired action is supplemented. Conversely, when the battery potential is below the lower threshold and battery charging is desired, an relatively inexhaustible power source (i.e., the charger 68) is available and a high resistance for the third FET 66 is of little consequence. Therefore, the device area of the first and third FETs 58,66 may be kept to a minimum and the overall size, complexity and cost of the unit is substantially reduced.

From the foregoing, it can be seen that an improved battery manager provided for effectively maintains a battery voltage within a specified voltage range. The battery manager maintains the battery voltage within the specified way in a cost effective manner yet addresses the concerns of transistor leakage, power dissipation, and component size.

Those skilled in the art can now appreciate from this description that the broad teachings of the present invention can be implemented in a variety of forms. Therefore, the true scope of the invention is vast, and other modifications will become apparent to the skilled practitioner upon study of the drawings, specification, and following claims.

What is claimed is:

1. A battery management protection circuit for regulating the voltage potential of a battery based upon an operating range having an upper threshold and a lower threshold and for providing a reduction in dissipated power when the battery is charging and when a load is drawing upon the battery, comprising:

a substrate;

a first microelectronic switch integrally formed on said substrate, said first microelectronic switch configured to limit charging of the battery when the voltage potential of the battery is greater than the upper threshold;

a second microelectronic switch integrally formed on said substrate and connected in parallel with said first microelectronic switch, said second microelectronic switch configured to limit discharging of the battery when the voltage potential of the battery is less than the lower threshold; and a third microelectronic switch integrally formed on said substrate and connected in parallel with said first microelectronic switch and said second microelectronic switch, said third microelectronic switch encompassing a substantially larger area of said substrate as compared to each of said first microelectronic switch and said second microelectronic switch such that a substantially reduced resistive path is presented by said third microelectronic switch relative to the resistive paths associated with said first and second microelectronic switches, said reduced resistive path providing reduced dissipated power while the battery is charging and when the load is drawing upon the battery in said operating range.

2. The battery management protection circuit of claim 1, further comprising a non-linear device connected in-line with said first microelectronic switch, said non-linear device operating in a reversed-bias mode when the voltage potential of the battery is greater than the upper threshold.

3. The battery management protection circuit of claim 1, further comprising a pn junction having an anode connected to said first microelectronic switch and a cathode having a connection configured to receive a charger.

4. The battery management protection circuit of claim 1, further comprising a pn junction having an anode with a connection configured to receive the battery and a cathode connected to said first microelectronic switch.

5. The battery management protection circuit of claim 1, further comprising a non-linear device connected in-line with said second microelectronic switch, said non-linear device operating in a reversed-bias mode when the voltage potential of the battery is less than the lower threshold.

6. The battery management protection circuit of claim 1, further comprising a pn junction having a cathode connected to said second microelectronic switch and an anode having a connection configured to receive a charger.

7. The battery management protection circuit of claim 1, further comprising a pn junction having a cathode with a connection configured to receive the battery and an anode connected to said second microelectronic switch.

8. The battery management protection circuit of claim 1, wherein said third microelectronic switch is a Field Effect Transistor.

9. The battery management protection circuit of claim 1, wherein said third microelectronic switch is a p-channel enhancement Field Effect Transistor.

10. The battery management protection circuit of claim 1, wherein said reduced resistive path presented by said third microelectronic switch has a total path resistance of less than about 50 milliohms.

11. The battery management protection circuit of claim 1, wherein said substrate is a p-minus substrate.

12. The battery management protection circuit of claim 1, wherein said third microelectronic switch is a p-channel enhancement FET.

13. The battery management protection circuit of claim 1, wherein said substantially larger area encompassed by said third microelectronic switch is in the vicinity of 750,000 microns by 0.6 microns.

14. The battery management protection circuit of claim 1, wherein said first microelectronic switch, said second microelectronic switch and said third microelectronic switch are p-channel enhancement FETs.

15. A method for regulating the voltage potential of a battery based upon an operating range having an upper threshold and a lower threshold and for providing a reduction in dissipated power when the battery is charging and when a load is drawing upon the battery, comprising the steps of:

forming a substrate;

forming a first microelectronic switch on said substrate;

configuring said first microelectronic switch to limit charging of the battery when the voltage potential of the battery is greater than the upper threshold;

forming a second microelectronic switch on said substrate;

connecting said second microelectronic switch in parallel with said first microelectronic switch;

configuring said second microelectronic switch to limit discharging of the battery when the voltage potential of the battery is less than the lower threshold;

forming a third microelectronic switch on said substrate;

encompassing a substantially larger area of said substrate with said third microelectronic switch as compared to each of said first microelectronic switch and said second microelectronic switch such that a substantially reduced resistive path is presented by said third microelectronic switch relative to the resistive paths associated with each of said first microelectronic switch and said second microelectronic switches; and connecting said third microelectronic switch in parallel with said first microelectronic switch and said second microelectronic switch such that said reduced resistive path provides reduced dissipated power while the battery is charging and when the load is drawing upon the battery in said operating range.

16. The method of claim 15, further comprising the step of connecting a non-linear device in-line with said first microelectronic switch and configuring said non-linear device to operate in a reversed-bias mode when the voltage potential of the battery is greater than the upper threshold.

17. The method of claim 15, further comprising the step of connecting an anode of a pn junction to said first microelectronic switch and configuring a cathode of said pn junction to receive a charger.

18. The method of claim 15, further comprising the step of connecting an anode of a pn junction to a battery and a cathode of said pn junction to said first microelectronic switch.

19. The method of claim 15, further comprising the step of connecting a non-linear device in-line with said second third microelectronic switch and operating said non-linear device in a reversed-bias mode when the voltage potential of the battery is less than the lower threshold.

20. The method of claim 15, further comprising the step of connecting a cathode of a pn junction to said second microelectronic switch and a anode of said pn junction to a charger.

21. The method of claim 15, further comprising the step of connecting an cathode of a pn junction to a battery and an anode of said pn junction to said second electronic switch.

22. The method of claim 15, wherein said first microelectronic switch is a Field Effect Transistor.

23. The method of claim 15, wherein said reduced resistive path presented by said third microelectronic switch has a total path resistance of less than about 50 milliohms.

24. The method of claim 15, wherein said step of forming a substrate forms a p-minus substrate.

25. The method of claim 15, wherein said step of forming said third microelectronic switch on said substrate forms a p-channel enhancement FET.

26. The method of claim 15, wherein said step of encompassing a substantially larger area of said substrate with said third microelectronic switch as compared to each of said first microelectronic switch and said second microelectronic switch encompasses an area in the vicinity of 750,000 microns by 0.6 microns.

27. The method of claim 15, wherein said first microelectonic switch, said second microelectronic switch and said third microelectronic switch are p-channel enhancement FETs.

28. A battery manager for protecting against overcharging and undercharging of a battery by maintaining the voltage potential of the battery within an operating range and for providing a reduction in dissipated power when the battery is charging and when a load is drawing upon the battery, comprising:

a controller for measuring the voltage potential of the battery, said controller generating a control signal indicative of the voltage potential; and a protection circuit that receives said control signal from said controller and regulates current flow to the battery and current flow from the battery, said protection circuit including:

a substrate:

a first microelectronic switch integrally formed on said substrate, said first microelectronic switch configured to limit charging of the battery when the voltage potential of the battery is greater than the operating range;

a second microelectronic switch integrally formed on said substrate and connected in parallel with said first microelectronic switch, said second microelectronic switch configured to limit discharging of the battery when the voltage potential of the battery is less than the operating range; and a third microelectronic switch integrally formed on said substrate and connected in parallel with said first microelectronic switch and said second microelectronic switch, said third microelectronic switch encompassing a substantially larger area of said substrate as compared to each of said first microelectronic switch and said second microelectronic switch such that a substantially reduced resistive path is presented by said third microelectronic switch relative to the resistive paths associated with said first and second microelectronic switches, said reduced resistive path providing reduced dissipated power while the battery is charging and when the load is drawing upon the battery in said operating range.

29. The battery manager of claim 28, wherein said reduced resistive path presented by said third microelectronic switch has a total path resistance of less than about 50 milliohms.

30. The battery manager of claim 28, wherein said substrate is a p-minus substrate.

31. The battery manager of claim 28, wherein said third microelectronic switch is a p-channel enhancement FET.

32. The battery manager of claim 28, wherein said substantially larger area encompassed by said third microelectronic switch is in the vicinity of 750,000 microns by 0.6 microns.

33. The battery manager of claim 28, wherein said first microelectonic switch, said second microelectronic switch and said third microelectronic switch are p-channel enhancement FETs.

34. The battery manager of claim 28, wherein the load is a cellular telephone.

* * * * *